US012770047B2

(12) United States Patent
Kanta

(10) Patent No.: US 12,770,047 B2
(45) Date of Patent: Oct. 20, 2026

(54) TEST METHOD VALIDATION USING QUANTUM ALGORITHMS

(71) Applicant: Red Hat, Inc., Raleigh, NC (US)

(72) Inventor: Srinivasa Bharath Kanta, Bangalore (IN)

(73) Assignee: Red Hat, LLC, Raleigh, NC (US)

( * ) Notice: Subject to any disclaimer, the term of this patent is extended or adjusted under 35 U.S.C. 154(b) by 430 days.

(21) Appl. No.: 18/486,613

(22) Filed: Oct. 13, 2023

(65) Prior Publication Data

US 2025/0124325 A1 Apr. 17, 2025

(51) Int. Cl.

*G06N 10/60* (2022.01)
*G06F 17/10* (2006.01)
*G06N 10/00* (2022.01)
*G06N 10/20* (2022.01)
*G06N 10/70* (2022.01)

(52) U.S. Cl.

CPC ............. *G06N 10/60* (2022.01); *G06F 17/10* (2013.01); *G06N 10/00* (2019.01); *G06N 10/20* (2022.01); *G06N 10/70* (2022.01)

(58) Field of Classification Search

USPC .......................................................... 702/189
See application file for complete search history.

(56) References Cited

U.S. PATENT DOCUMENTS

2020/0234176 A1* 7/2020 Babbush ................. G06F 17/10
2020/0285985 A1* 9/2020 Javadiabhari .......... G06N 10/80
(Continued)

FOREIGN PATENT DOCUMENTS

CN 112232512 A 1/2021
EP 4189609 A1 6/2023

OTHER PUBLICATIONS

Elanchezhiyan, T., et al., "Implementing qubit validation framework based on phase estimation algorithm," International Journal of Scientific and Research Publications, vol. 12, Issue 4, Apr. 2022, ISSN 2250-3153, DOI: 10.29322/IJSRP.12.04.2022.p12410, http://dx.doi.org/10.29322/IJSRP.12.04.2022.p12410, Apr. 6, 2022, 7 pages.
(Continued)

*Primary Examiner* — Paul D Lee
(74) *Attorney, Agent, or Firm* — Dority & Manning, P.A.

(57) ABSTRACT

A quantum computing device initiates a first quantum algorithm comprising a test method implemented as a quantum oracle, the first quantum algorithm receiving an input of a first quantum register comprising one or more qubits and a second quantum register comprising one qubit, each qubit in the first quantum register corresponding to a test case for the test method. The quantum computing device receives an output of the first quantum algorithm. The quantum computing device initiates a second quantum algorithm, the second quantum algorithm receiving an input of a third quantum register and the output of the first quantum algorithm. The quantum computing device performs a measurement on the first quantum register and a measurement on the third quantum register. The quantum computing device determines, based on the measurement on the first quantum register and the measurement on the third quantum register, that the test method passed or failed.

20 Claims, 6 Drawing Sheets

(56) References Cited

U.S. PATENT DOCUMENTS

| | | | | |
|---|---|---|---|---|
| 2021/0042651 | A1 * | 2/2021 | Das | G06F 9/382 |
| 2021/0049493 | A1 * | 2/2021 | Vivoli | G06F 17/14 |
| 2021/0287127 | A1 * | 9/2021 | Burkot | G06N 10/60 |
| 2023/0274176 | A1 * | 8/2023 | Guimarães Silverio | G06N 10/60 706/62 |

OTHER PUBLICATIONS

Miranskyy, Andriy, et al., "On Testing Quantum Programs," Proceedings of the 41st International Conference on Software Engineering: New Ideas and Emerging Results, https://doi.org/10.1109/ICSE-NIER.2019.00023, arXiv:1812.09261v1 [cs.SE], https://doi.org/10.48550/arXiv.1812.09261, Dec. 21, 2018, 5 pages.

Author Unknown, "Deutsch-Jozsa Algorithm," Qiskit.org, https://learn.qiskit.org/course/ch-algorithms/deutsch-jozsa-algorithm, accessed online Sep. 28, 2023, 17 pages.

Author Unknown, "Quantum Phase Estimation in Qiskit," Quantum Computing UK, https://quantumcomputinguk.org/tutorials/quantum-phase-estimation-with-code, accessed online Sep. 28, 2023, 7 pages.

* cited by examiner

TEST METHOD VALIDATION USING QUANTUM ALGORITHMS

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices. As quantum computing continues to increase in popularity and become more commonplace, an ability to efficiently and accurately allocate qubits in real time will be desirable.

SUMMARY

The examples disclosed herein implement a test method validation service that performs test method validation using quantum algorithms. In particular, the test method validation service can use quantum computing techniques to reduce the execution time to test methods and functions with different test data. The output of a first quantum algorithm can be used as an input to a second quantum algorithm and measurements can then be performed to determine whether a test method passed or failed with all of the test data.

In one example, a method for test method validation using quantum algorithms is disclosed. The method includes initiating, by a quantum computing device, a first quantum algorithm comprising a test method implemented as a quantum oracle, wherein the first quantum algorithm receives an input of a first quantum register comprising one or more qubits and a second quantum register comprising one qubit, each qubit of the one or more qubits in the first quantum register corresponding to a test case for the test method. The method further includes receiving, by the quantum computing device, an output of the first quantum algorithm comprising the one or more qubits in the first quantum register. The method further includes initiating, by the quantum computing device, a second quantum algorithm, wherein the second quantum algorithm receives an input of a third quantum register and the output of the first quantum algorithm. The method further includes performing, by the quantum computing device, a measurement on the first quantum register and a measurement on the third quantum register. The method further includes determining, by the quantum computing device based on the measurement on the first quantum register and the measurement on the third quantum register, that the test method passed or failed.

In another example, a quantum computing device for test method validation using quantum algorithms is disclosed. The quantum computing device comprises a system memory, and a processor device communicatively coupled to the system memory. The processor device is to initiate a first quantum algorithm comprising a test method implemented as a quantum oracle, wherein the first quantum algorithm receives an input of a first quantum register comprising one or more qubits and a second quantum register comprising one qubit, each qubit of the one or more qubits in the first quantum register corresponding to a test case for the test method. The processor device is further to receive an output of the first quantum algorithm comprising the one or more qubits in the first quantum register. The processor device is further to initiate a second quantum algorithm, wherein the second quantum algorithm receives an input of a third quantum register and the output of the first quantum algorithm. The processor device is further to perform a measurement on the first quantum register and a measurement on the third quantum register. The processor device is further to determine, based on the measurement on the first quantum register and the measurement on the third quantum register, that the test method passed or failed.

In another example, a non-transitory computer-readable storage medium for test method validation using quantum algorithms is disclosed. The non-transitory computer-readable storage medium stores thereon computer-executable instructions that, when executed, cause one or more processor devices to initiate a first quantum algorithm comprising a test method implemented as a quantum oracle, wherein the first quantum algorithm receives an input of a first quantum register comprising one or more qubits and a second quantum register comprising one qubit, each qubit of the one or more qubits in the first quantum register corresponding to a test case for the test method. The instructions further cause the processor device to receive an output of the first quantum algorithm comprising the one or more qubits in the first quantum register. The instructions further cause the processor device to initiate a second quantum algorithm, wherein the second quantum algorithm receives an input of a third quantum register and the output of the first quantum algorithm. The instructions further cause the processor device to perform a measurement on the first quantum register and a measurement on the third quantum register. The instructions further cause the processor device to determine, based on the measurement on the first quantum register and the measurement on the third quantum register, that the test method passed or failed.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
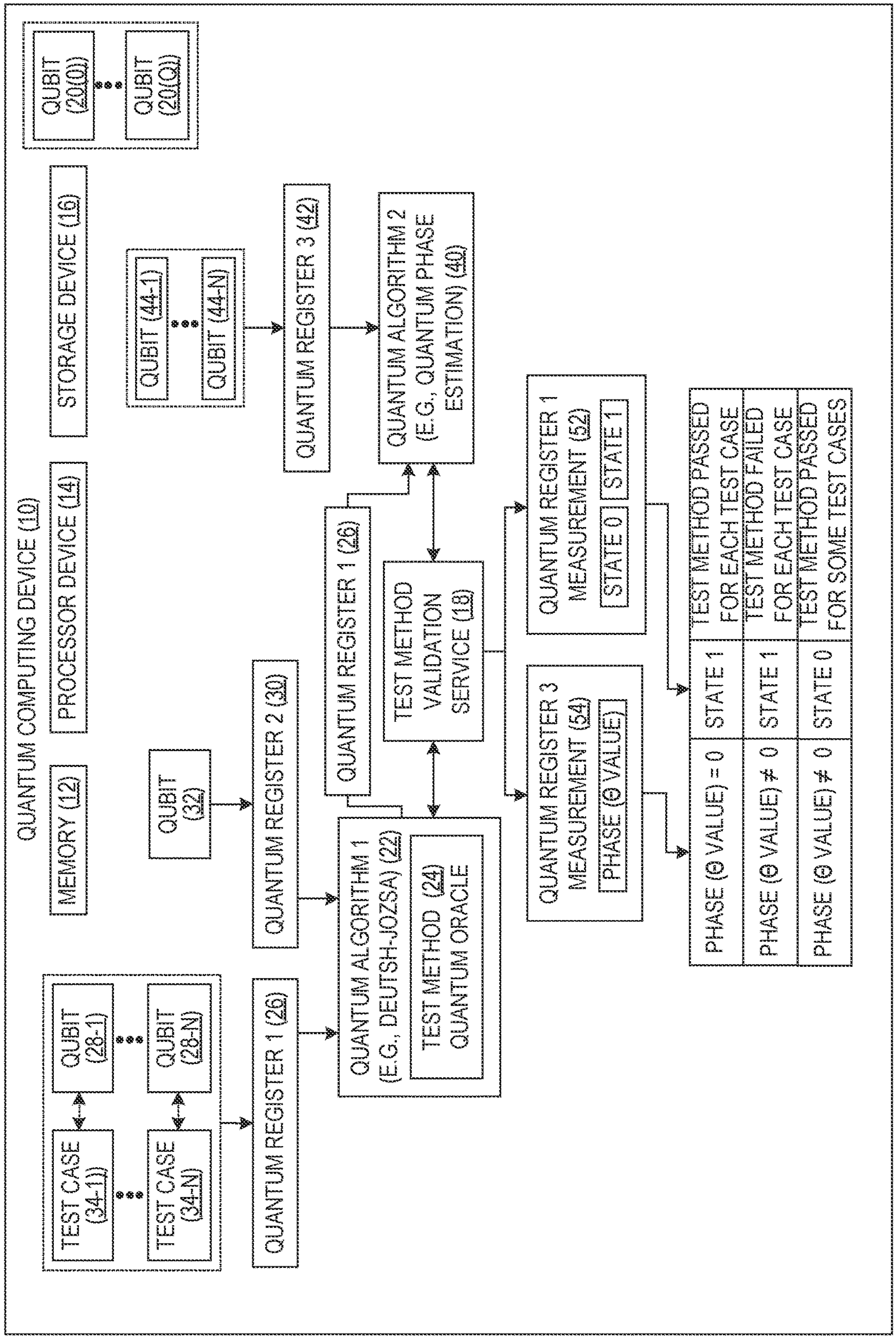
FIG. 1 is a block diagram of a quantum computing device in which examples of test method validation using quantum algorithms may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first executing quantum service" and "second executing quantum service," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the elements unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," which have characteristics that differ from those of classical (i.e., non-quantum) bits used in classical computing. Qubits may be employed by quantum services that are executed by quantum computing devices.

When testing a method or function, various different test data is used to fully test the method. The total time to test a method with all of the test data depends on the inputs. For instance, if there are n inputs, then the execution time to test all inputs is O(n). When a large quantity of test data is required to fully test a method, testing the method can take more time.

The examples disclosed herein implement a test method validation service that performs test method validation using quantum algorithms. In particular, the test method validation service can use quantum computing techniques to reduce the execution time to test methods or functions with different test data. The output of a first quantum algorithm, such as the Deutsch-Jozsa algorithm, can be used as an input to a second quantum algorithm, such as the quantum phase estimation algorithm, and measurements of the qubit state and phase of the qubits in the quantum registers can then be performed to determine whether a test method passed or failed for all of the test data. As a result, the execution time to test a method with all of the test data can be reduced to O(1).

The first quantum algorithm (e.g., the Deutsch-Jozsa algorithm) can implement the test method as an oracle and take an input of qubits in a quantum register, the qubits corresponding to the test data. The output of the qubits in the quantum register from initiating the first quantum algorithm on the qubits can be input into the second quantum algorithm (e.g., the quantum phase estimation algorithm). The qubits in the quantum register can then be measured for a qubit state and phase value, which can be used to determine whether the test method passed or failed for all of the test data with O(1) time complexity.

FIG. 1 is a block diagram of a quantum computing device 10 that comprises a system memory 12, a processor device 14, and a storage device 16. It is to be understood that the quantum computing device 10 in some examples may include constituent elements in addition to those illustrated in FIG. 1. In the example of FIG. 1, the quantum computing device 10 implements a test method validation service 18 that performs test method validation using quantum algorithms.

In the example of FIG. 1, the quantum computing device 10 implements a set of one or more qubits 20(0)-20(Q) for use by quantum services executed by the quantum computing device 10. To maintain information for the qubit(s) 20(0)-20(Q), the quantum computing device 10 includes a qubit registry (not shown), which comprises a plurality of qubit registry entries each corresponding to a qubit such as the one or more qubits 20(0)-20(Q). The qubit registry maintains and provides access to data relating to the qubits implemented by the quantum computing device 10, such as a count of the total number of qubits implemented by the quantum computing device 10 and a count of the number of available qubits that are currently available for allocation, as non-limiting examples. Each of the qubit registry entries of the qubit registry also stores qubit metadata for a corresponding qubit. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an quantum phenomena indicator that indicates whether the corresponding qubit is in an entangled state and/or a superposition state.

The quantum computing device 10 of FIG. 1 executes one or more quantum services (not shown). The quantum services are processes that employ qubits such as the one or more qubits 20(0)-20(Q) to provide desired functionality. Execution of the quantum services is facilitated by a quantum service manager (not shown) and a quantum service scheduler (not shown). The quantum service manager of the quantum computing device 10 handles operations for creating, monitoring, and terminating quantum services, while the quantum service scheduler of the quantum computing device 10 controls the scheduling of quantum services for execution by the processor device 14, and allocation of processing resources to executing quantum services. The functionality of the quantum service manager and the quantum service scheduler may be made accessible to other processes (e.g., via a defined application programming interface (API), as a non-limiting example).

The test method validation service 18 may initiate a first quantum algorithm 22, such as the Deutsch-Jozsa algorithm. The Deutsch-Jozsa algorithm is a quantum algorithm with a proven execution time of a method or function implemented as an oracle that takes less time in quantum computers compared to classical computers. The oracle is a given black box quantum computer that implements a function and is able to produce a solution for the function. A method or function that is to be tested (e.g., test method 24) can be implemented as the oracle for the first quantum algorithm 22 (e.g., the Deutsch-Jozsa algorithm). The first quantum algorithm 22 can receive an input of a first quantum register 26 that includes one or more qubits 28-1-28-N (collectively, qubits 28) and a second quantum register 30 that includes one qubit 32 to initiate the first quantum algorithm 22. A quantum register comprises of qubits and is the quantum version of a classical processor register, but the quantum register can store all of the possible values of qubits.

Each of the qubits 28 in the first quantum register 26 can correspond to a test case of one or more test cases 34-1-34-N (collectively, test cases 34) for the test method 24. For instance, the test cases 34 can have test data that meet criteria such as checking the test method 24 output by providing valid data, checking the test method 24 output by providing invalid data, checking the test method 24 output with an illegal data format, checking the test method 24 output with a boundary condition dataset, and checking the test method 24 output with the equivalence partition test data, as non-limiting examples. For example, the test method 24 may be to check that the legal age of a person to perform a job is between 18-60 years old. The test cases 34 for this test method 24 may include test data of a valid age of 35, an invalid age of 9, boundary conditions of 17, 18, 19, 60, and 61, and an equal partition dataset, as non-limiting examples. In this example, because there are eight test cases 34, the first quantum register 26 includes eight qubits 28.

The test method validation service 18 may receive the output of the first quantum algorithm 22, with the output including the qubits 28 in the first quantum register 26 after initiating the first quantum algorithm 22 with the test method 24 as the oracle and the qubits 28 in the first quantum register 26. The test method validation service 18 can initiate a second quantum algorithm 40, such as the quantum phase estimation algorithm. The quantum phase estimation algorithm is a quantum algorithm that can estimate the phase of a unitary operator. In the quantum phase estimation algorithm, a first set of qubits can be used to control unitary operations (referred to as counting qubits) and a second set of qubits can have the unitary operations applied to them. The second quantum algorithm 40 can receive an input of a third quantum register 42 and the output of the first quantum algorithm 22 (i.e., the qubits 28 in the first quantum register 26 after initiating the first quantum algorithm 22 with the test method 24 as the oracle and the qubits 28 in the first quantum register 26) to initiate the second quantum algorithm 40.

After the second quantum algorithm 40 is applied with the qubits 28 in the first quantum register 26 output from the first quantum algorithm 22 and the qubits 44 in the third quantum register 42, the test method validation service 18 can perform a measurement 52 on the first quantum register 26 and a measurement 54 on the third quantum register 42. The measurement 52 on the first quantum register 26 can include a state of 0 or 1 for the qubits 28. The measurement 54 on the third quantum register 42 can include a phase (θ value) of the qubits 44.

The test method validation service 18 can determine that the test method 24 passed for each of the test cases 34, failed for each of the test cases 34, or passed for at least one but not all of the test cases 34, based on the measurement 52 on the first quantum register 26 and the measurement 54 on the third quantum register 42. The test method 24 passes for each of the test cases 34 when the measurement 52 on the first quantum register 26 is a state of 1 for the qubits 28 and the measurement 54 on the third quantum register 42 is a phase value of 0 for the qubits 44. The test method 24 fails for each of the test cases 34 when the measurement 52 on the first quantum register 26 is a state of 1 for the qubits 28 and the measurement 54 on the third quantum register 42 is a phase value other than 0 for the qubits 44. The test method 24 passes for at least one but not each of the test cases 34 when the measurement 52 on the first quantum register 26 is a state of 0 for the qubits 28 and the measurement 54 on the third quantum register 42 is a phase value of 0 or a value other than 0 for the qubits 44. When the state is 0 for the qubits 28, then some of the test cases 34 passed and some of the test cases 34 failed, so the phase value can be any value and the same result of only a portion of the test cases 34 passing can be determined. As a result, the test method 24 can be tested with all of the test cases 34 with O(1) time complexity.

It is to be understood that, because the test method validation service 18 is a component of the quantum computing device 10, functionality implemented by the test method validation service 18 may be attributed to the quantum computing device 10 generally. Moreover, in examples where the test method validation service 18 comprises software instructions that program the processor device 14 to carry out functionality discussed herein, functionality implemented by the test method validation service 18 may be attributed herein to the processor device 14. It is to be further understood that while, for purposes of illustration only, the test method validation service 18 is depicted as a single component, the functionality implemented by the test method validation service 18 may be implemented in any number of components, and the examples discussed herein are not limited to any particular number of components.

Figure 2:
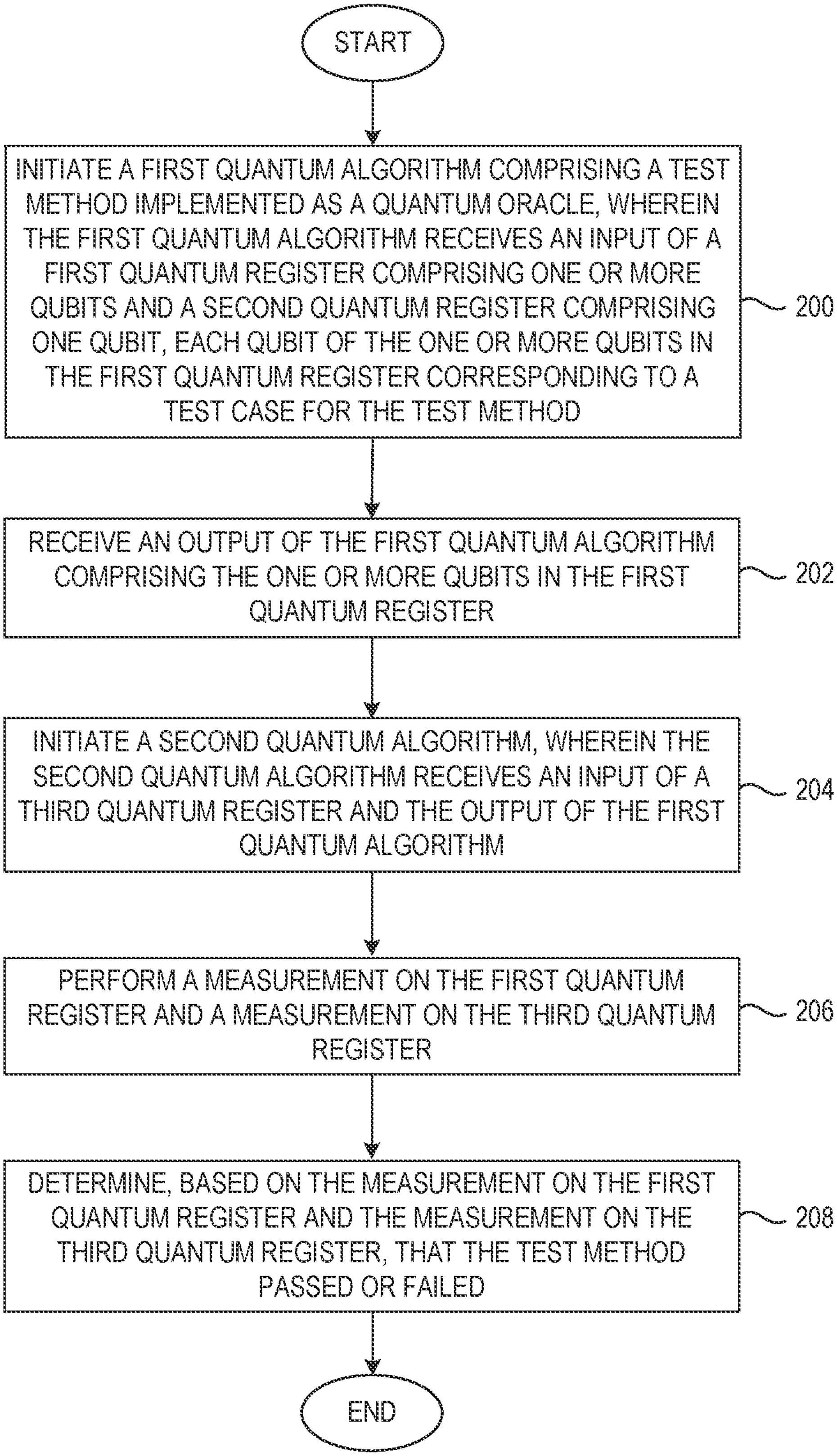
FIG. 2 is a flowchart illustrating operations performed by the quantum computing device of FIG. 1 for test method validation using quantum algorithms, according to one example.

FIG. 2 is a flowchart illustrating operations performed by the quantum computing device of FIG. 1 for test method validation using quantum algorithms, according to one example. Elements of FIG. 1 are referenced in describing FIG. 2 for the sake of clarity. In the example of FIG. 2, operations begin with a processor device of a quantum computing device, such as the processor device 14 of the quantum computing device 10 of FIG. 1, the processor device 14 to initiate a first quantum algorithm comprising a test method implemented as a quantum oracle, wherein the first quantum algorithm receives an input of a first quantum register comprising one or more qubits and a second quantum register comprising one qubit, each qubit of the one or more qubits in the first quantum register corresponding to a test case for the test method (block 200). The processor device 14 is then to receive an output of the first quantum algorithm comprising the one or more qubits in the first quantum register (block 202). The processor device 14 is then to initiate a second quantum algorithm, wherein the second quantum algorithm receives an input of a third quantum register and the output of the first quantum algorithm (block 204). The processor device 14 is then to perform a measurement on the first quantum register and a measurement on the third quantum register (block 206). The processor device 14 is then to determine, based on the measurement on the first quantum register and the measurement on the third quantum register, that the test method passed or failed (block 208).

Figure 3:
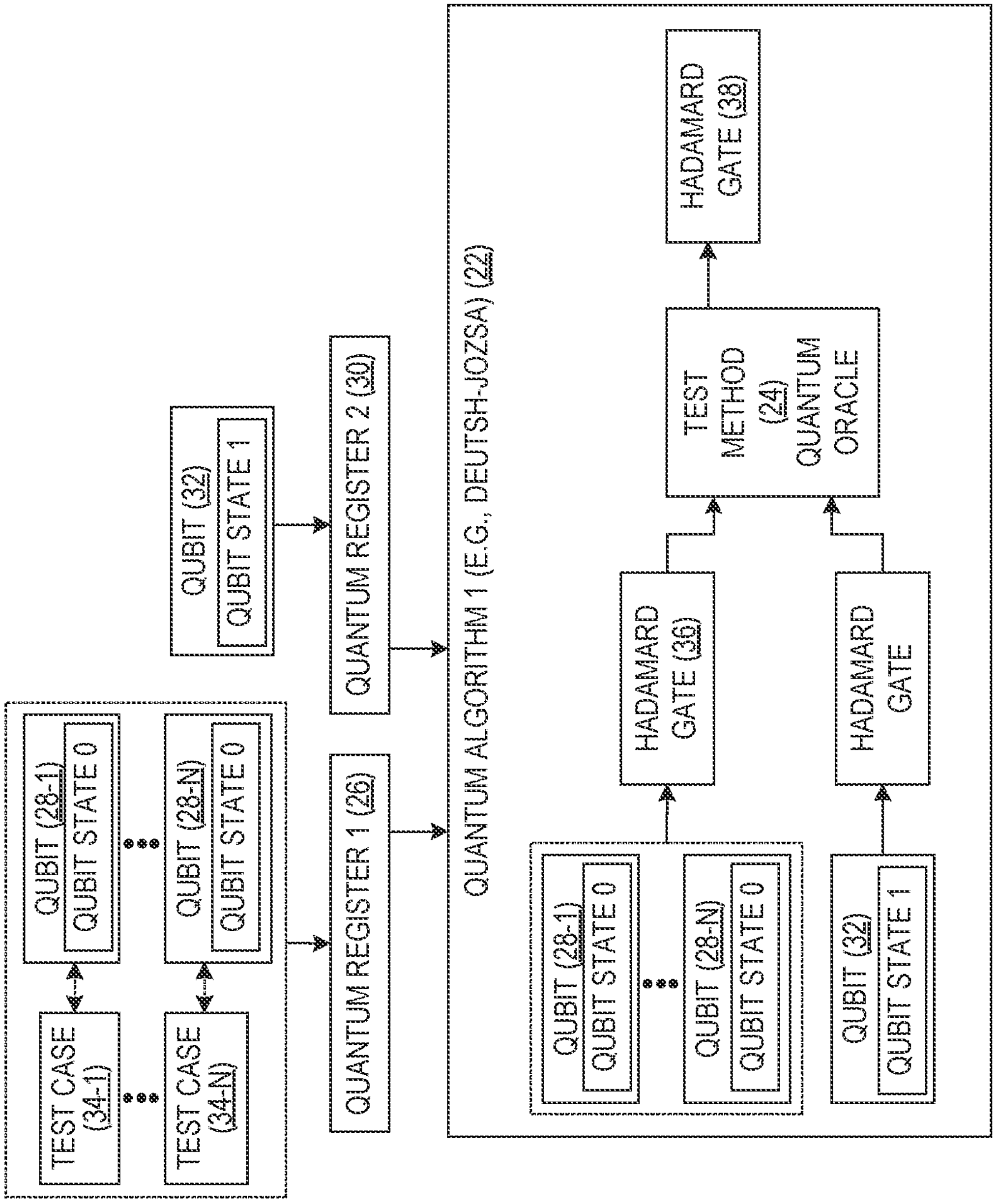
FIG. 3 is a block diagram of the quantum computing device of FIG. 1 for test method validation using quantum algorithms, according to one example.

FIG. 3 is a block diagram of the quantum computing device of FIG. 1 for test method validation using quantum algorithms, according to one example. Elements of FIG. 1 are referenced in describing FIG. 3 for the sake of clarity. In the example of FIG. 3, the test method validation service 18 initiates the first quantum algorithm 22 (e.g., the Deutsch-Jozsa algorithm) by preparing the first quantum register 26 with the qubits 28, with one qubit for each test case of the test cases 34 that is to be tested, and the second quantum register 30 with one qubit 32. For instance, if ten test cases are to be tested with the test method 24, then ten qubits can be prepared in the first quantum register 26. The qubits 28 in the first quantum register 26 can each be initialized with a qubit state |0> and the qubit 32 in the second quantum register 30 can be initialized with a qubit state |1>.

A first Hadamard gate 36 can be applied to each qubit of the qubits 28 in the first quantum register 26. Applying the first Hadamard gate 36 to each qubit of the qubits 28 in the first quantum register 26 results in the state $$\frac{1}{\sqrt{2^{n+1}}}\Sigma_{x=0}^{2^n-1}|x\rangle(|0\rangle-|1\rangle).$$

The test method 24, which is implemented as the oracle for the first quantum algorithm 22, can be applied with these resulting qubits (i.e., the qubits 28 in the first quantum register 26 after applying the first Hadamard gate 36 to each of the qubits 28 in the first quantum register 26). After applying the test method 24 as the oracle for the first quantum algorithm 22, the state is $$\frac{1}{\sqrt{2^{n+1}}}\Sigma_{x=0}^{2^n-1}(-1)^{f(x)}|x\rangle(|0\rangle-|1\rangle).$$

A second Hadamard gate 38 can be applied to each qubit of the qubits 28 in the first quantum register 26, which are in the above state after applying the test method 24 implemented as the oracle with the qubits 28 in the first quantum register 26. Applying the second Hadamard gate 38 to each qubit of the qubits 28 in the first quantum register 26 results in the state $$\frac{1}{2^n}\Sigma_{y=0}^{2^n-1}\left[\Sigma_{x=0}^{2^n-1}(-1)^{f(x)}(-1)^{x\cdot y}\right]|y\rangle.$$

The output of the first quantum algorithm 22 that is received by the test method validation service 18 can be the qubits 28 in this resulting state in the first quantum register 26 after applying the second Hadamard gate 38 to each of the qubits 28 in the first quantum register 26. The second quantum algorithm 40 can then be initiated with the qubits 28 in the first quantum register 26 in this resulting state. The qubits 28 are not yet measured but are instead used in the second quantum algorithm 40. If the qubits 28 were measured at this point, the test method validation service 18 would not be able to determine whether the test method 24 passed or failed for each of the test cases 34 because only a state of 0 or 1 can be measured at this point and a state of 1 indicates that all of the test cases 34 either passed or failed, so it cannot be determined whether the test method 24 has passed for all of the test cases 34 or failed completely. Instead, the first quantum register 26 is used as an input into the second quantum algorithm 40 (e.g., the quantum phase estimation algorithm) in order to determine whether an output of a state 1 is because the test method 24 passed for all of the test cases 34 or failed for all of the test cases 34.

Figure 4:
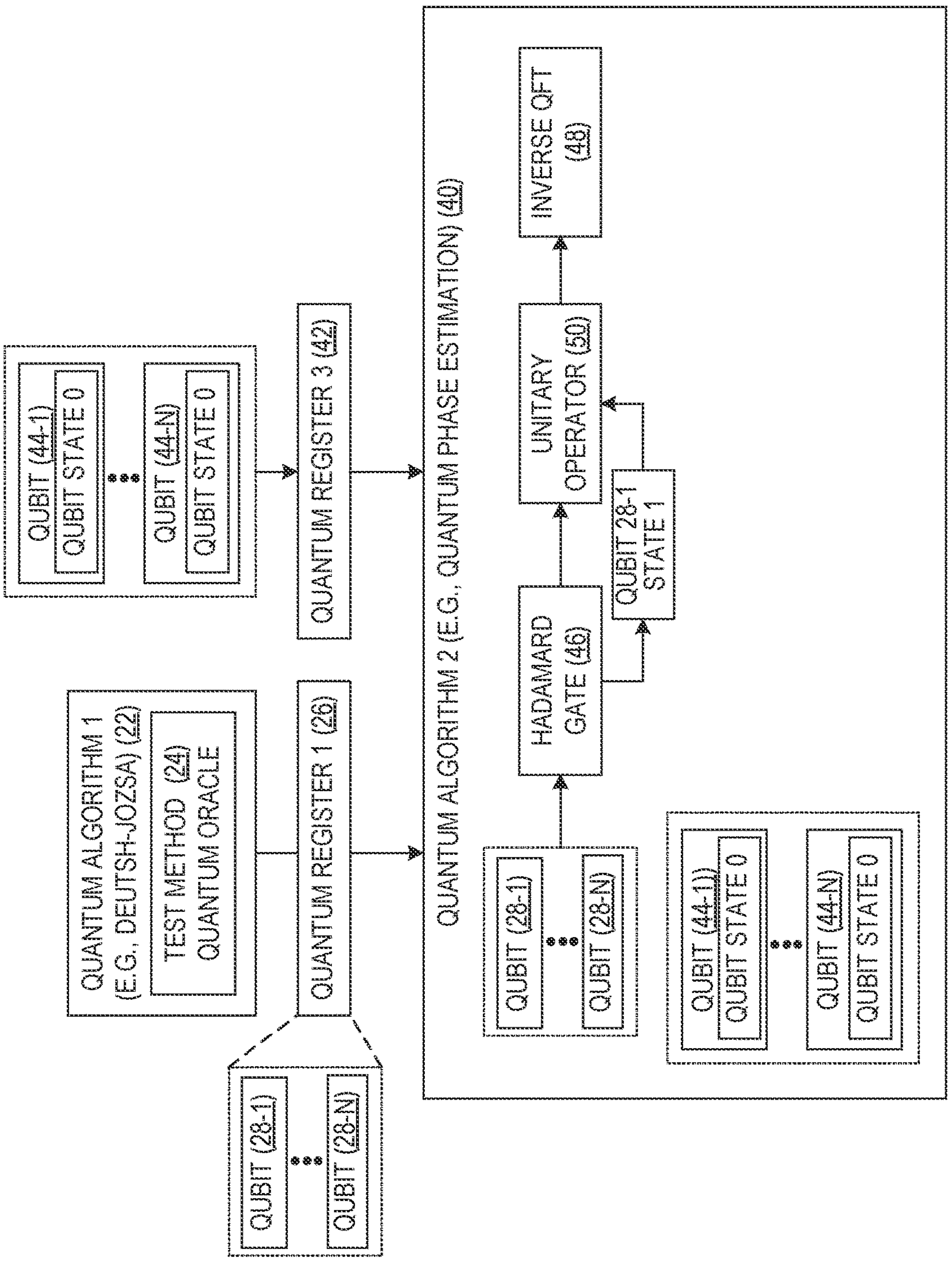
FIG. 4 is a block diagram of the quantum computing device of FIG. 1 for test method validation using quantum algorithms, according to one example.

FIG. 4 is a block diagram of the quantum computing device of FIG. 1 for test method validation using quantum algorithms, according to one example. Elements of FIG. 1 are referenced in describing FIG. 4 for the sake of clarity. In the example of FIG. 4, the test method validation service 18 initiates the second quantum algorithm 40 (e.g., the quantum phase estimation algorithm) by preparing the third quantum register 42 with one or more qubits 44-1-44-N (collectively, qubits 44). The qubits 44 in the third quantum register 42 are the same number of qubits as the qubits 28 that are in the first quantum register 26, which corresponds to the number of test cases 34 being tested by the test method 24. The qubits 44 in the third quantum register 42 can each be initialized with a qubit state |0>. The third quantum register 42 can act as the counting register for the quantum phase estimation algorithm (e.g., the second quantum algorithm 40) on which the value $2^n\theta$ can be stored, and the qubits 28 in the first quantum register 26 can have the unitary operations applied to them. The input to the second quantum algorithm 40 includes the qubits 44 in the third quantum register 42 and the qubits 28 in the first quantum register 26 in the state output by the first quantum algorithm 22

$$\left(\frac{1}{2^n}\Sigma_{y=0}^{2^n-1}\left[\Sigma_{x=0}^{2^n-1}(-1)^{f(x)}(-1)^{x\cdot y}\right]|y\rangle\right).$$

A Hadamard gate 46 can be applied to each qubit of the qubits 28 in the first quantum register 26. The controlled unitary that applies a unitary operator 50 on the first quantum register 26 is introduced when the corresponding control bit is in the qubit state |1>. A control bit of a qubit 28-1 of the qubits 28 in the first quantum register 26 may have a qubit state |1> and the unitary operator 50 may be applied to the qubit 28-1 in the first quantum register 26 in response. The resulting state of the qubit 28-1 is $$\frac{1}{2^{\frac{n}{2}}}\Sigma_{k=0}^{2^n-1}e^{2\pi i\theta k}|k\rangle\otimes|\psi\rangle$$

and an inverse quantum Fourier transform 48 can be applied to the qubit 28-1. The measurement 52 on the first quantum register 26 for the state and the measurement 54 on the third quantum register 42 for the phase can then be performed.

Figure 5:
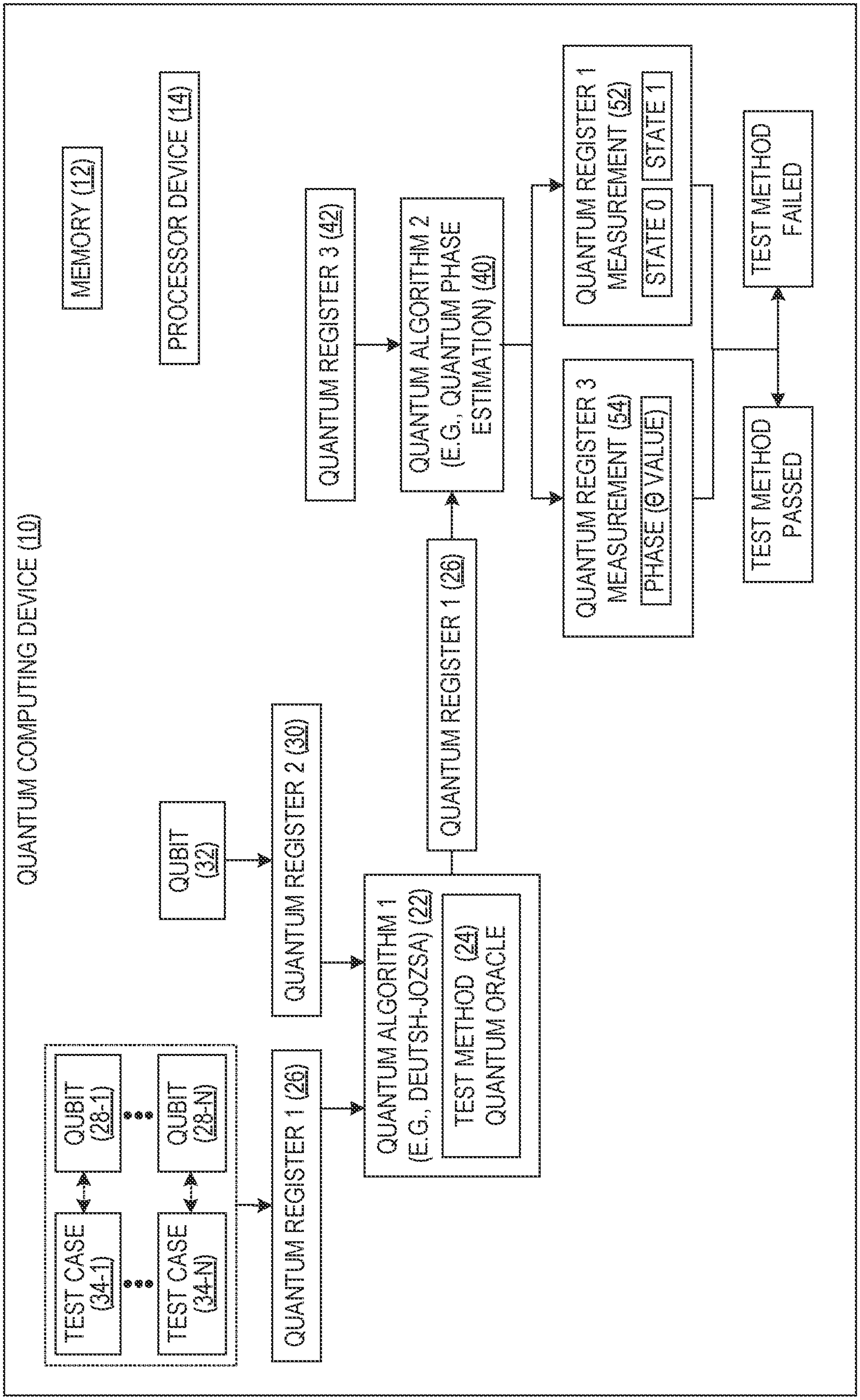
FIG. 5 is a block diagram of the quantum computing device of FIG. 1 for test method validation using quantum algorithms, according to one example.

FIG. 5 is a block diagram of the quantum computing device 10 of FIG. 1 for test method validation using quantum algorithms, according to one example. Elements of FIG. 1 are referenced in describing FIG. 5 for the sake of clarity. In the example of FIG. 5, a quantum computing device 10 comprises a system memory 12 and a processor device 14 coupled to the system memory 12. The processor device 14 is to initiate a first quantum algorithm 22 comprising a test method 24 implemented as a quantum oracle, wherein the first quantum algorithm 22 receives an input of a first quantum register 26 comprising one or more qubits 28 and a second quantum register 30 comprising one qubit 32, each qubit of the one or more qubits 28 in the first quantum register 26 corresponding to a test case 34 for the test method 24. The processor device 14 is further to receive an output of the first quantum algorithm 22 comprising the one or more qubits 28 in the first quantum register 26. The processor device 14 is further to initiate a second quantum algorithm 40, wherein the second quantum algorithm 40 receives an input of a third quantum register 42 and the output of the first quantum algorithm 22. The processor device 14 is further to perform a measurement 52 on the first quantum register 26 and a measurement 54 on the third quantum register 42. The processor device 14 is further to determine, based on the measurement 52 on the first quantum register 26 and the measurement 54 on the third quantum register 42, that the test method 24 passed or failed.

Figure 6:
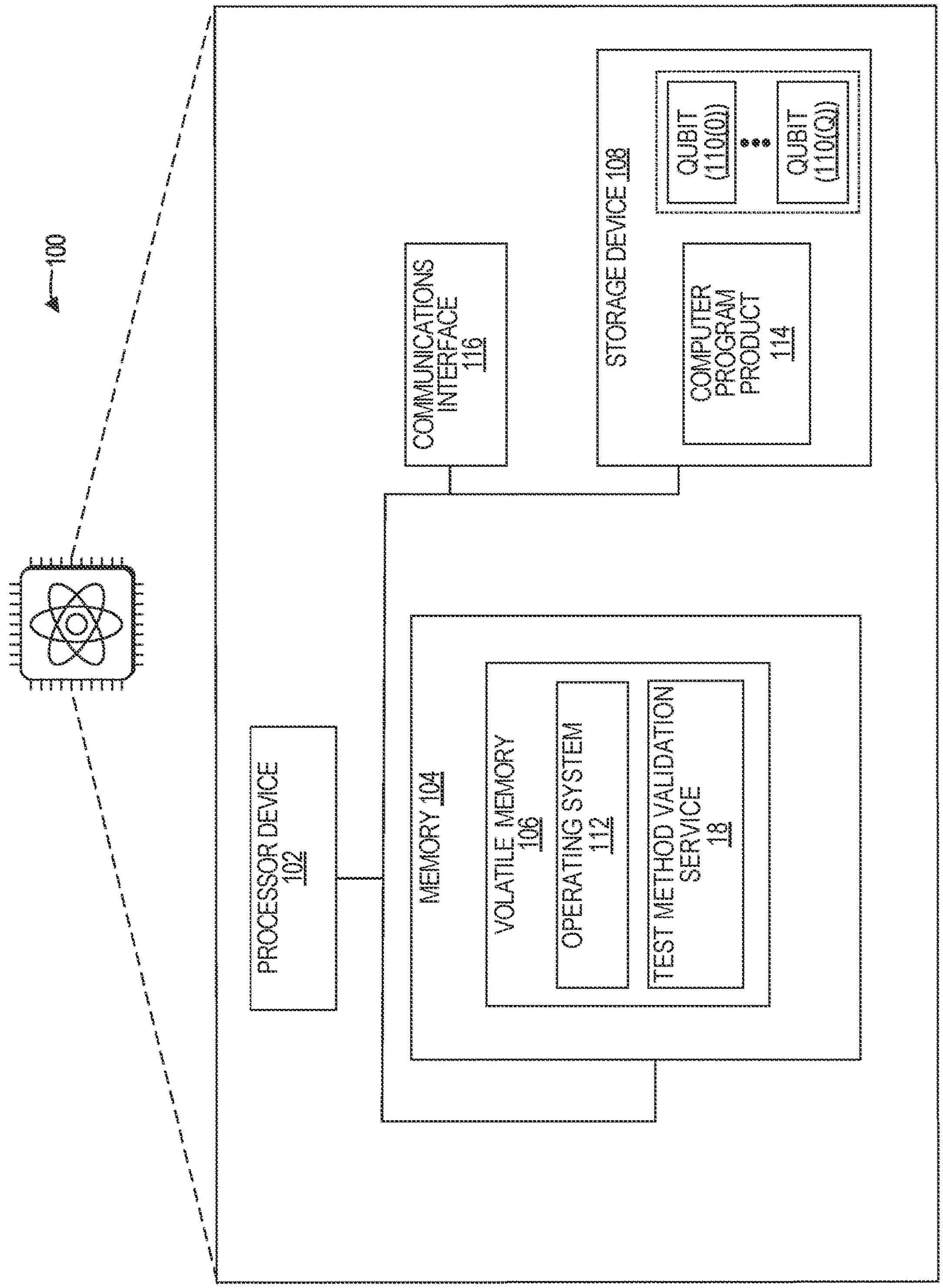
FIG. 6 is a block diagram of a quantum computing device suitable for implementing examples, according to one example.

FIG. 6 is a block diagram of a quantum computing device 100, such as the quantum computing device 10 of FIG. 1, suitable for implementing examples, according to one example. The quantum computing device 100 may comprise any suitable quantum computing device or devices. The quantum computing device 100 can operate using classical computing principles or quantum computing principles. Thus, in some implementations, portions of the quantum computing device 100 (e.g., the test method validation service 18) may be executed using classical computing components and/or algorithms. When using quantum computing principles, the quantum computing device 100 performs computations that utilize quantum-mechanical phenomena, such as superposition and entanglement. The quantum computing device 100 may operate under certain environmental conditions, such as at or near zero degrees (0°) Kelvin. When using classical computing principles, the quantum computing device 100 utilizes binary digits that have a value of either zero (0) or one (1).

The quantum computing device 100 includes a processor device 102 and a system memory 104. The processor device 102 can be any commercially available or proprietary processor suitable for operating in a quantum environment. The system memory 104 may include volatile memory 106 (e.g., random-access memory (RAM)).

The quantum computing device 100 may further include or be coupled to a non-transitory computer-readable medium such as a storage device 108. The storage device 108 may comprise, for example, an internal or external hard disk drive (HDD) (e.g., enhanced integrated drive electronics (EIDE) or serial advanced technology attachment (SATA)) for storage, memory, or the like. The storage device 108 and other drives associated with computer-readable media and computer-usable media may provide non-volatile storage of data, data structures, computer-executable instructions, and the like. The storage device may also provide functionality for storing one or more qubits 110(0)-110(Q).

A number of modules can be stored in the storage device 108 and in the volatile memory 106, including an operating system 112 and one or more modules, such as the test method validation service 18. All or a portion of the examples may be implemented as a computer program product 114 stored on a transitory or non-transitory computer-usable or computer-readable medium, such as the storage device 108, which includes complex programming instructions, such as complex computer-readable program code, to cause the processor device 102 to carry out the steps described herein. Thus, the computer-readable program code can comprise computer-executable instructions for implementing the functionality of the examples described herein when executed on the processor device 102.

An operator may also be able to enter one or more configuration commands through a keyboard (not illustrated), a pointing device such as a mouse (not illustrated), or a touch-sensitive surface such as a display device (not illustrated). The quantum computing device 100 may also include a communications interface 116 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method, comprising:

initiating, by a quantum computing device, a first quantum algorithm comprising a test method implemented as a quantum oracle, wherein the first quantum algorithm receives an input of a first quantum register comprising a plurality of qubits and a second quantum register comprising one qubit, each qubit of the plurality of qubits in the first quantum register corresponding to a respective test case of a corresponding plurality of test cases for the test method;

receiving, by the quantum computing device, an output of the first quantum algorithm comprising the first quantum register, wherein each of the plurality of qubits in the first quantum register comprises a resulting quantum state based on the first quantum algorithm;

initiating, by the quantum computing device, a second quantum algorithm, wherein the second quantum algorithm receives an input of a third quantum register and the output of the first quantum algorithm;

performing, by the quantum computing device based on the second quantum algorithm, a measurement on the first quantum register and a measurement on the third quantum register, wherein the measurement on the first quantum register and the measurement on the third quantum register are indicative of a pass or fail of each of the corresponding plurality of test cases; and determining, by the quantum computing device based on the measurement on the first quantum register and the measurement on the third quantum register, that the test method passed or failed.

2. The method of claim 1, wherein the output of the first quantum algorithm comprises the plurality of qubits in the first quantum register subsequent to initiating the first quantum algorithm with the plurality of qubits in the first quantum register.

3. The method of claim 1, wherein initiating the first quantum algorithm comprises:

initializing each qubit of the plurality of qubits in the first quantum register with a qubit state |0> and the one qubit in the second quantum register with a qubit state |1>;

applying a first Hadamard gate to each qubit of the plurality of qubits in the first quantum register;

applying the test method implemented as a quantum oracle with the plurality of more qubits in the first quantum register subsequent to applying the first Hadamard gate to each qubit of the plurality of qubits in the first quantum register; and applying a second Hadamard gate to each qubit of the plurality of one or more qubits in the first quantum register subsequent to applying the test method implemented as a quantum oracle with the plurality of qubits in the first quantum register.

4. The method of claim 1, wherein initiating the second quantum algorithm comprises:

preparing the third quantum register with a plurality of qubits, each of the plurality of qubits with a qubit state |0>, wherein the first quantum register and the third quantum register have the same number of qubits;

applying a Hadamard gate to each qubit of the plurality of qubits in the first quantum register; and applying an inverse quantum Fourier transform to each qubit of the plurality of qubits in the first quantum register subsequent to applying the Hadamard gate to each qubit of the plurality of qubits in the first quantum register.

5. The method of claim 4, further comprising:

determining that a control bit of a qubit in the first quantum register has a qubit state |1>; and in response to determining that the control bit of the qubit in the first quantum register has the qubit state |1>, applying a unitary operator on the qubit in the first quantum register.

6. The method of claim 1, wherein the measurement on the first quantum register comprises a state of 0 or 1.

7. The method of claim 1, wherein the measurement on the third quantum register comprises a phase value.

8. The method of claim 1, wherein determining, based on the measurement on the first quantum register and the measurement on the third quantum register, that the test method passed or failed comprises:

determining that the test method passed for each test case for the test method when the measurement of the first quantum register comprises a state of 1 and the measurement on the third quantum register comprises a phase value of 0.

9. The method of claim 1, wherein determining, based on the measurement on the first quantum register and the measurement on the third quantum register, that the test method passed or failed comprises:

determining that the test method failed for each test case for the test method when the measurement of the first quantum register comprises a state of 1 and the measurement of the third quantum register comprises a phase value other than 0.

10. The method of claim 1, wherein determining, based on the measurement on the first quantum register and the measurement on the third quantum register, that the test method passed or failed comprises:

determining that the test method passed for at least one test case and failed for at least one test case when the measurement of the first quantum register comprises a state of 0.

11. The method of claim 1, wherein the first quantum algorithm is a Deutsch-Jozsa algorithm.

12. The method of claim 1, wherein the second quantum algorithm is a quantum phase estimation algorithm.

13. A quantum computing device, comprising:

a memory;

a processor device coupled to the memory, the processor device to:

initiate a first quantum algorithm comprising a test method implemented as a quantum oracle, wherein the first quantum algorithm receives an input of a first quantum register comprising a plurality of qubits and a second quantum register comprising one qubit, each qubit of the plurality of qubits in the first quantum register corresponding to a respective test case of a corresponding plurality of test cases for the test method;

receive an output of the first quantum algorithm comprising the first quantum register, wherein each of the plurality of qubits in the first quantum register comprises a resulting quantum state based on the first quantum algorithm;

initiate a second quantum algorithm, wherein the second quantum algorithm receives an input of a third quantum register and the output of the first quantum algorithm;

perform, based on the second quantum algorithm, a measurement on the first quantum register and a measurement on the third quantum register, wherein the measurement on the first quantum register and the measurement on the third quantum register are indicative of a pass or fail of each of the corresponding plurality of test cases; and determine, based on the measurement on the first quantum register and the measurement on the third quantum register, that the test method passed or failed.

14. The quantum computing device of claim 13, wherein, to initiate the first quantum algorithm, the processor device is further to:

initialize each qubit of the plurality of qubits in the first quantum register with a quantum state |0> and the one qubit in the second quantum register with a quantum state |1>;

apply a first Hadamard gate to each qubit of the plurality of qubits in the first quantum register;

apply the test method implemented as a quantum oracle with the plurality of qubits in the first quantum register subsequent to applying the first Hadamard gate to each qubit of the plurality of qubits in the first quantum register; and apply a second Hadamard gate to each qubit of the plurality of qubits in the first quantum register subsequent to applying the test method implemented as a quantum oracle with the plurality of qubits in the first quantum register.

15. The quantum computing device of claim 13, wherein, to initiate the second quantum algorithm, the processor device is further to:

prepare the third quantum register with a plurality of qubits, each of the plurality of qubits with a quantum state |0>, wherein the first quantum register and the third quantum register have the same number of qubits;

apply a Hadamard gate to each qubit of the plurality of qubits in the first quantum register; and apply an inverse quantum Fourier transform to each qubit of the plurality of qubits in the first quantum register subsequent to applying the Hadamard gate to each qubit of the plurality of qubits in the first quantum register.

16. The quantum computing device of claim 13, wherein, to determine, based on the measurement on the first quantum register and the measurement on the third quantum register, that the test method passed or failed, the processor device is further to:

determine that the test method passed for each test case for the test method when the measurement of the first quantum register comprises a state of 1 and the measurement on the third quantum register comprises a phase value of 0.

17. The quantum computing device of claim 13, wherein, to determine, based on the measurement on the first quantum register and the measurement on the third quantum register, that the test method passed or failed, the processor device is further to:

determine that the test method failed for each test case for the test method when the measurement of the first quantum register comprises a state of 1 and the measurement of the third quantum register comprises a phase value other than 0.

18. The quantum computing device of claim 13, wherein, to determine, based on the measurement on the first quantum register and the measurement on the third quantum register, that the test method passed or failed, the processor device is further to:

determine that the test method passed for at least one test case and failed for at least one test case when the measurement of the first quantum register comprises a state of 0 and the measurement of the third quantum register comprises a phase value other than 0.

19. The quantum computing device of claim 13, wherein the first quantum algorithm is a Deutsch-Jozsa algorithm and the second quantum algorithm is a quantum phase estimation algorithm.

20. A non-transitory computer-readable storage medium that includes computer-executable instructions that, when executed, cause one or more processor devices to:

initiate a first quantum algorithm comprising a test method implemented as a quantum oracle, wherein the first quantum algorithm receives an input of a first quantum register comprising a plurality of qubits and a second quantum register comprising one qubit, each qubit of the plurality of qubits in the first quantum register corresponding to a respective test case of a corresponding plurality of test cases for the test method;

receive an output of the first quantum algorithm comprising the first quantum register, wherein each of the plurality of qubits in the first quantum register comprises a resulting quantum state based on the first quantum algorithm;

initiate a second quantum algorithm, wherein the second quantum algorithm receives an input of a third quantum register and the output of the first quantum algorithm;

perform, based on the second quantum algorithm, a measurement on the first quantum register and a measurement on the third quantum register, wherein the measurement on the first quantum register and the measurement on the third quantum register are indicative of a pass or fail of each of the corresponding plurality of test cases; and determine, based on the measurement on the first quantum register and the measurement on the third quantum register, that the test method passed or failed.

* * * * *